United States Patent Office 3,211,682
Patented Oct. 12, 1965

3,211,682
POLYVINYL CHLORIDE PLASTICIZED WITH AN EPOXIDIZED ESTER OF 1,2,6-HEXANETRIOL
Robert M. Brice, Minneapolis, Minn., assignor to Archer-Daniels-Midland Company, Minneapolis, Minn., a corporation of Delaware
No Drawing. Filed June 15, 1960, Ser. No. 36,160
2 Claims. (Cl. 260—23)

This invention relates to improved anti-fogging resin plastics and a method of preparing the same. More particularly the invention concerns vinyl resins plasticized with an epoxy anti-fogging plasticizers, which resins are resistant to a combination of variable cold and freeze, light and heat conditions, and the method of providing the same.

The use of epoxy oils and esters for plasticizing vinyl resins has long been known to the art. Despite this knowledge, the problem of preventing exudation and vaporization under conditions of light with extremes of heat and cold has not been satisfactorily solved and the art does not disclose any answers to preventing the steamed and smoky appearance of glass enclosures containing vinyl plastic seat covers, upholstery, window shades, caulks and the like, including vinyl impregnated fabrics and other plasticized vinyl structure. This shortcoming in the art appears to be primarily due to failure to recognize and cope with the problems of compatibility, high and low temperature stability and flexibility coupled with resistance to volatility and fogging when the plasticized vinyl is exposed to cycles of cooling or freezing conditions and a combination of light and elevated temperatures. Of a critical nature is the question of utilizing high levels of plasticizer in vinyls used in the automotive industry. In addition, the problem has been to develop a plasticizer that can be used over a wide range of plasticizer levels, so that the compounder can accomplish specific efficiency and low temperature flexibility performance without sacrificing fogging properties or compatibility characteristics.

Accordingly, it is an object of this improvement to provide the art with improved vinyl plastics containing a unique plasticizer that reduces fogging characteristics (i.e., the tendency to deposit fog or film on nearby surfaces when exposed to sunlight or artificial sources of infra-red and ultra-violet light at low or elevated temperatures,) while also possessing excellent compatibility and other desirable characteristics of a good plasticizer at high levels in the vinyl plasticized therewith, and the method of providing the same.

Another object of this invention is to provide an improvement in the art of manufacture and use of molding, coating, impregnating, and production of adhesive and glass and other laminating films with synthetic plastic material containing an anti-fogging plasticizer as embodied herein.

To the accomplishment of the foregoing and related ends, this improvement then comprises the features herein more fully described and exemplified. The following description setting forth in detail certain illustrative embodiments of the invention or improvement, these being indicative of but a few of the various ways in which the principle thereof may be employed and the products that are obtained.

The epoxidized plasticizers of the present invention are preferably prepared by esterifying approximately 1 mole of 1,2,6-hexanetriol with 2 moles of oleic acid. The residual hydroxyl group of the triol is esterified with acetic acid or anhydride. Any conventional process for esterification in the above sequence may be utilized. The oleic acid, as indicated, may be in part linoleic acid. Commercial sources of oleic acid include the tall oil acids, tallow fatty acids, soybean fatty acids, and the like.

After esterification, the substantially completely esterified triol, as described, is treated in a conventional peracid process or an in situ acetic or formic acid process, to obtain the epoxidized derivative (i.e., the oleate becomes an epoxysterate). The mechanics and chemistry of such esterification and epoxidation processes are known to those skilled in the art and therefore not described in detail herein.

In general, composite mixtures of a vinyl resin of the character of vinyl chloride homopolymers and copolymers including polyvinyl chloride, vinyl chloride-vinyl acetate, vinylidene chloride and other vinyl copolymers and the like, can be mixed and compounded with conventional ingredients which are compatible with my improved non-fogging plasticizer. The amount of plasticizer may vary from about 3 parts to about 220 parts by weight to 100 parts by weight vinyl resin dependent upon the amount of relative flexibility desired. Further some additional conventional plasticizer and the usual fillers, pigments and the like may be included for some vinyl applications recognizable to those skilled in the art. The amount of additional plasticizer will influence performance and the advantage of the herein described plasticizer will be proportional to its percentage of the total plasticizer used. It is recognizable to those skilled in the art that in the lower range, less flexible products are the end results of utilizing only the inventive plasticizer, and more flexible products are obtained in the higher range. Accordingly, a relatively wide range between molded stiff vinyl plastic forms to very flexible limp vinyl films can be produced with my plasticizer utilized in amounts in the range indicated. In either case it will be recognized by those skilled in the art that about 40 parts to about 125 parts plasticizer to about 100 parts vinyl resin will normally be used for making flexible sheetings as seat covers, window shades, and the like.

The following formulations will exemplify vinyl resin compositions containing the fog-reducing plasticizer embodied herein:

EXAMPLE 1

| | Parts |
|---|---|
| Polyvinyl chloride resin | 100 |
| Conventional barium-cadmium stabilizer | 1.6 |
| Calcium carbonate | 24 |
| Black conventional pigment | [1]1.6 |
| Plasticizer | 66 |

[1] May be omitted.

The plasticizer used in this example was the epoxidized derivative of 1 mole of 1,2,6-hexanetriol which had been esterified with two moles oleic acid and the remaining hydroxyl esterified with acetic anhydride. The plasticizer was added to the vinyl resin at about a 70% level. The mixture was compounded by milling at 310° F. on a 2 roll laboratory mill of 10 minutes until a 20 mil stock obtained. This stock was then subjected to a fogging test in comparison with exactly similar vinyl stocks prepared with like amounts of conventional plasticizers as follows (A) dioctyl phthalate, (B) diisodecyl phthalate, (C) conventional polybasic acid-polyhydric alcohol polyester, (D) conventional pentaerythritol-$C_6$ acid ester, (E) the inventive plasticizer, and (F) ditridecyl phthalate. The results of the fogging test are set forth in Table I, as follows:

Table I

| Compound | Condition of cover glass |
|---|---|
| (A) | Heavy condensate. |
| (B) | Heavy condensate. |
| (C) | Medium to heavy condensate. |
| (D) | Heavy condensate. |
| (E) | No condensate. |
| (F) | Heavy condensate. |

The fogging test was made by placing three 1½ inch diameter discs of the prepared 20 mil stock at the bottom of glass jars large enough to hold the discs. The jars were covered with plate glass. The jars were then positioned with the plate covers 21 inches below a 500 watt G–30 infra-red industrial bulb held in a 10 inch specular reflector. The air temperature surrounding the jars was held at 190° F. and exposure was maintained for 1 hour.

The absence of any epoxy plasticizer compound for vinyl resins, of the character as generally known to the industry, and in the nature of epoxidized soybean oil, epoxidized linseed oil, and many of the other epoxy acid and ester forms thereof, is due to the practical fact that such compounds as are conventionally known are incompatible at required levels for plasticizing vinyl resin articles. The amounts of such known and conventionally utilized epoxidized fatty ester and fatty oil plasticizers to obtain needed and suitable flexibility therewith, are also known to produce unsatisfactory vinyl plastics. Further, at low and high levels, the fear of exudation that occurs with extreme softeners, the lack of freeze resistance and their known fogging characteristics has curtailed any real and practical advancement in the use of epoxidized materials for plasticizing vinyl resins with high levels of epoxy plasticizer, or even at sufficient levels for practical flexibility in norman use. It was first discovered that epoxidized oils were more compatible with vinyl resins than the oils per se. This is true only to a certain extent and coupled with this relatively limited use has been the problem of fogging, not solved or known to be answered in the art. Consequently, there would be no point in showing the incompatibility and fogging characteristics of those epoxies generally known as vinyl plasticizers which are not suitable at the high levels required in production of vinyl automobile seat covers, upholstery, dash covers, back and side panel covers, head liners, caulking on interior of automobiles and the like.

EXAMPLE 2

| | Parts |
|---|---|
| Conventional dispersion grade polyvinyl resin | 100 |
| Plasticizer | 65 |
| Stabilizer (conventional barium-cadmium) | 2 |

The plasticizer was the same as described in Example 1 and the mixture prepared by stirring the plasticizer and stabilizer into the conventional polyvinyl resin dispersion. This vinyl resin is obtained of conventional particle size of about 1½ microns and an ASTM specific viscosity in the general range of about 0.5. The mixture was used to impregnate a fabric sheet and the impregnated fabric cured by heating 350° F. for 10 minutes. The fabric when tested in the manner described showed no condensate due to the plasticizer. The method of heat curing a vinyl resin is well known to the art and the presence of a high portion of the plasticizer embodied herein requires no other material change than incorporation of the said plasticizers with other suitable materials and by suitable compounding, as described. Curing of the plasticized vinyl resins are carried out in a conventional manner, as known to those skilled in the art.

The following illustrates a plasticized polyvinyl resin caulking composition:

EXAMPLE 3

| | Parts |
|---|---|
| Polyvinyl chloride (commercial form) | 112.5 |
| CaCO$_3$ | 303.7 |
| Asbestos fibers | 33.8 |
| Plasticizer (Example 1) | 218.1 |
| Barium cadmium stabilizer | 4 |

This caulking composition is prepared by simply mixing the above ingredients in a Banbury mixer until thoroughly mixed. The mixed composition is then heated for about 5 minutes at 400° F. to obtain a workable plastic caulking suitable for application in a conventional manner by conventional means. The caulking composition, tested in the manner described, was non-fogging.

In general practice, it will be most feasible to calender the plasticized vinyl resin to a desired thickness with heat curing in a conventional manner. Otherwise, the conventional process of applying the warm milled vinyl resin to a fabric and providing a subsequent impregnation by pressure rolls followed by heat curing is well known to the art.

Having described the present embodiment of my improvement in the art in accordance with the patent statutes, it will be recognized that some modifications and variations as hereinto set forth may be made without departing from the spirit and scope thereof. The specific embodiments described are given by way of examples, exemplifying and illustrative of the improvements herein provided and which are to be limited only by the terms of the appended claims.

I claim:

1. A plastic composition comprising vinyl chloride resin plasticized with 1,2,6-hexanetriol monoacetate di(epoxystearate).

2. The composition of claim 1 wherein from 40 to 125 parts of said 1,2,6-hexanetriol monoacetate di(epoxystearate) are present per 100 parts of said vinyl resin and wherein said resin is vinyl chloride copolymer.

References Cited by the Examiner

UNITED STATES PATENTS

| 2,912,397 | 11/59 | Houska et al. | 260—23 X |
| 2,971,012 | 2/61 | Wolff | 260—23 X |
| 2,978,463 | 4/61 | Kuester et al. | 260—23 X |
| 3,050,481 | 8/62 | Ault et al. | 260—23 X |
| 3,057,749 | 10/62 | Luzena | 117—238.8 |

LEON J. BERCOVITZ, *Primary Examiner.*

ALPHONSO D. SULLIVAN, MILTON STERMAN,
*Examiners.*